United States Patent
Gonzalez Senosiain et al.

(10) Patent No.: US 8,493,760 B2
(45) Date of Patent: Jul. 23, 2013

(54) ELECTRIC CIRCUIT FOR CONVERTING DIRECT CURRENT INTO ALTERNATING CURRENT

(75) Inventors: Roberto Gonzalez Senosiain, Sarriguren (ES); Francisco Javier Ancin Jimenez, Sarriguren (ES); Javier Coloma Calahorra, Sarriguren (ES)

(73) Assignee: Ingeteam Power Technology, S.A., Zamudio (ES)

( * ) Notice: Subject to any disclaimer, the term of this patent is extended or adjusted under 35 U.S.C. 154(b) by 0 days.

(21) Appl. No.: 13/240,975

(22) Filed: Sep. 22, 2011

(65) Prior Publication Data

US 2012/0008358 A1  Jan. 12, 2012

Related U.S. Application Data

(63) Continuation of application No. PCT/ES2010/070090, filed on Feb. 19, 2010.

(30) Foreign Application Priority Data

Mar. 23, 2009 (ES) .................... 200900781

(51) Int. Cl.
*H02M 7/537* (2006.01)

(52) U.S. Cl.
USPC .......................... 363/131; 363/132

(58) Field of Classification Search
USPC ............... 363/109, 113, 120–122, 131, 132, 363/178; 323/222–224, 271, 272, 282–284
See application file for complete search history.

(56) References Cited

U.S. PATENT DOCUMENTS

8,013,472 B2 * 9/2011 Adest et al. .................... 307/77
2008/0055951 A1 3/2008 Schreiber

FOREIGN PATENT DOCUMENTS

EP 1 892 811 A2 2/2008

OTHER PUBLICATIONS

String and Module Integrated Inverters for Single-Phase Grid Connected Photovoltaic Systems—A Review J. M. A. Myrzik, and M. Calais, Member, IEEE, Jun. 26, 2003.*
Fritz Schimpf et al., "Grid connected Converters for Photovoltaic, State of the Art, Ideas for Improvement of Transformerless Inverters", Nordic Workshop on Power and Industrial Electronics, Jun. 2008, 6pp.
International Search Report for PCT/ES2010/070090 dated Jun. 18, 2010.
J.M.A. Myrzik et al., "String and Module Integrated Inverters for Single-Phase Grid Connected Photovoltaic Systems—A Review", Power Tech Conference Proceedings, 2003, 8 pgs., vol. 2, 23-26, IEEE, Bologna.
Roberto González et al., "Transformerless Inverter for Single-Phase Photovoltaic Systems", IEEE Transactions on Power Electronics, vol. 22, No. 2, Mar. 2007, pp. 693-697.

* cited by examiner

*Primary Examiner* — Adolf Berhane
*Assistant Examiner* — Yemane Mehari
(74) *Attorney, Agent, or Firm* — Sughrue Mion, PLLC

(57) ABSTRACT

Electric circuit for converting direct into alternating current specially designed for photovoltaic systems connected to the electrical grid without a transformer, and enabling the earthing of one of the input terminals (2) of the photovoltaic generator, thereby working with a wide range of input voltages and having a high efficiency.

12 Claims, 2 Drawing Sheets

ELECTRIC CIRCUIT FOR CONVERTING DIRECT CURRENT INTO ALTERNATING CURRENT

OBJECT OF THE INVENTION

The present invention relates to an electric circuit for converting direct current into alternating current. The invention has its main field of application in the industry intended to design electronic devices, and more particularly to those obtained within the field of power systems for converting photovoltaic solar energy. The invention may also be applicable in other fields such as power generation by electrochemical cells or other devices that provide direct current.

The invention provides a structure for converting DC/AC (Direct current/Alternating current) specifically designed for photovoltaic systems connected to the electrical grid without a transformer, which allows connecting one of the input terminals of the photovoltaic generator to ground, thus achieving to operate with a wide range of input voltages and having a high performance.

BACKGROUND OF THE INVENTION

Photovoltaic systems with electrical grid connection are formed by a set of photovoltaic panels (also called photovoltaic array or generator) and a conversion stage (also called inverter) that conditions the energy produced by the panels and injects thereof into the electrical grid. These are generally private facilities, which seek to maximize the economic benefit obtained from the sale of the energy produced to power companies. Therefore, cheap, reliable and high efficiency inverters are looked for.

Traditionally, in such facilities a transformer has been included between the inverter and the electrical grid, which provides galvanic isolation between the facility and the electrical grid. However, the fact that the transformer operates at low frequency (50/60 Hz) increases the size, weight and price of the conversion stage, while reducing its performance.

One option for eliminating the low frequency transformer, while maintaining galvanic isolation of the facility, is to use inside the converter a DC/DC conversion stage with a high frequency transformer. The use of a high frequency transformer allows reducing the size and weight of the conversion stage; however it increases the complexity thereof, while reducing its performance and reliability.

The removal of the transformer (both high and low frequency) allows obtaining an easier, cheaper and lighter conversion stage, while improving the performance thereof. Therefore, in recent years, the use of transformerless conversion structures has become very popular.

Certain photovoltaic facilities require the ground connection (earthing) of one of the terminals of the photovoltaic array. In some cases, this requirement has technological nature. This is the case of facilities in which certain photovoltaic panels with thin layer are used, wherein by grounding the negative a premature degradation of the panel is avoided, or facilities in which the flow of ground currents through the parasite capacity of the photovoltaic array is desired to be completely eliminated in order to improve the electromagnetic behavior of the conversion stage. In other cases, the need of grounding is determined by the current legislation, such as the NEC (National Electrical Code) of the United States.

Typically, photovoltaic systems with electrical grid connection are connected to a grid of the type T-N (in which the neutral point of the grid is ground connected). In this type of electrical grid, the use of a conversion stage with galvanic isolation (with a low or high frequency transformer) allows grounding one of the terminals of the photovoltaic array without arising any problems in the operation of the conversion stage. However, grounding the photovoltaic array in transformerless conversion stages based on conventional conversion structures, such as the H-bridge or those shown in the patent documents DE10221592A1, DE102004030912B3 and WO2008015298A1 is not possible.

In order to solve these problems raised when grounding the photovoltaic array in transformerless conversion stages, new topologies such as that proposed in DE 196 42 522 C1, have been developed. However, the current injected to the electrical grid through this topology is pulsed, which requires a large output filter in order to absorb the current harmonics.

This problem is solved in DE 197 32 218 C1. This structure is based on the connection of two DC/DC converters: Zeta and Cuk. The control of the semiconductors is carried out in such a way that during the positive half-cycle of the grid voltage the converter behaves like a Zeta and during the negative half-cycle as a Cuk. However, in this topology, as in DE 196 42 522 C1, by lacking boost DC/DC stage, the power fluctuation characteristic of one-phase systems causes a ripple in the voltage of the photovoltaic array at a frequency equal to twice the grid frequency, which results in the reduction of the energy obtained in the photovoltaic array by fluctuating the voltage around the maximum power point.

US 2004 0164557 A1 describes a simple topology that allows connecting the photovoltaic array negative to ground. The operation of this topology is based on obtaining a bipolar DC voltage (positive and negative with respect to the photovoltaic array negative), i.e. a DC bus with the midpoint connected to ground. From this bus, the use of a half bridge allows obtaining sinusoidal output voltages. The fact of using the voltage of the photovoltaic array as positive voltage on the DC bus makes that the structure can not be used with voltages of photovoltaic array lower than the maximum voltage of the electrical grid.

DE 10 2006 012 164 A1 describes a topology that allows connecting only one of the input terminal to ground, thus achieving at its output a bipolar DC voltage. However, all semiconductors used must withstand the maximum bus voltage, which must be at least twice the maximum voltage of the grid, which increases the switching losses and reduces the performance of the conversion stage.

US 2008 0266919 describes another topology that allows obtaining a bipolar DC voltage. In this case two cuk-type DC/DC converters are used. However, the first DC/DC converter must handle all the power of the system. In addition, the semiconductors used must withstand the bus voltage, which must be at least twice the maximum voltage of the grid, which increases the losses of the topology, decreasing its performance.

Another topology that allows obtaining a bipolar DC voltage is proposed in WO 2008 151587 A1. This topology uses two transistors controlled by the same control signal, three diodes and two magnetically coupled windings for obtaining a bipolar output voltage. The proposed operating mode makes that, all the time, the current drawn by the DC/DC stage, seen from the photovoltaic array, be a pulsating current, and therefore, the current in the coil W1 will be greater than that circulating in the event that the current flows continuously to the DC/DC stage, with the consequent increase of losses in semiconductors and coils.

The topologies proposed in US 2004 0164557 A1, DE 10 2006 012 164 A1, US 2008 0266919, and WO 2008 151587 A1 are based on obtaining a bipolar DC voltage (bus with the midpoint connected to ground). In order to obtain an AC voltage from this bipolar voltage DC/AC topologies, as the half-bridge or NPC half-bridge, can be used:

1. Half-bridge: This is a simple conversion topology that only consists of two switching elements (of transistor-type with antiparallel diode). However, its modes of operation only allow obtaining two levels of output voltage: Vbus/2 and -Vbus/2, being necessary to use a large inductance in order to filter the current harmonics produced. On the other hand, since the used semiconductors must be capable of supporting all bus voltage, this topology has large switching losses.
2. NPC Half-bridge. In order to improve the behavior of the half-bridge, a DC/AC NPC half-bridge can be used as a conversion structure. It is a structure formed by 6 switching elements (4 are of transistor-type with antiparallel diode and 2 diode-type). This topology allows obtaining three levels of output voltage: Vbus/2, 0 and -Vbus/2. This will reduce the current ripple, compared to that in a half bridge, but the complexity thereof is increased by using 6 switching elements.

The power fluctuation characteristic of the one-phase systems causes a ripple in the bus voltage. In order to reduce this variation large capacities are used. Using a half-bridge or NPC half-bridge requires a bus voltage of at least twice the grid voltage, twice of that used in DC/AC structures as the H-bridge, which will increase the size of the required capacity compared to that used on an H-bridge. This increase in capacity increases the cost and considerably increases the volume of the conversion stage.

DESCRIPTION OF THE INVENTION

To achieve the objectives and solve the problems stated above, the invention proposes an electrical circuit of the one-phase inverter-type that conditions and converts direct electrical energy in alternating electrical energy, and which is configured so as to comprise:

two direct current connections to which a source of direct current is connected;

a first temporary energy accumulator connected between the direct current connections;

a first branch connected between the direct current connections, and which comprises a first switching element, a first inductance and a second switching element;

a second branch comprising a third switching element, connected at the junction point of the second switching element with the first inductance;

a third branch comprising a fourth switching element, connected at the junction point of the second switching element with a direct current connection;

a second temporary energy accumulator connected between the third and fourth switching elements;

a fourth branch comprising a fifth switching element and a sixth switching element; with the fifth switching element being connected to the junction point of the second temporary energy accumulator with the third switching element, and with the sixth switching element being connected to the junction point of the second temporary energy accumulator with the fourth switching element;

a fifth branch comprising a seventh switching element that is connected between the junction point of the first switching element with the first inductance and the junction point of the second temporary energy accumulator with the fourth switching element and the sixth switching element;

two alternating current connections, to which an element selected from the electrical grid and a load ready to work with alternating current, is connected;

a sixth branch comprising a second inductance connected between the junction point of the fifth switching element and the sixth switching element and an alternating current connection.

In a preferred embodiment of the invention the first switching element is of the type MOSFET, IGBT, J-FET transistor or other device that is adapted to this configuration, the second, third, fourth, fifth and sixth switching elements are MOSFET, IGBT, J-FET transistors or other device that is adapted to this configuration, each of which are connected in antiparallel to a diode; and the seventh switching element is of diode-type.

In another preferred embodiment, an eighth switching element connected in parallel to the third switching element and the second switching element is included. In this case, the first and second switching elements are MOSFET, IGBT, J-FET transistors or other device that is adapted to this configuration, the fourth, fifth, sixth and eighth switching elements are MOSFET, IGBT, J-FET transistors or other device that matches this configuration, connected in anti-parallel to respective diodes, and the third and seventh switching elements are of diode-type.

Temporary energy accumulators may consist of capacitive, ultra capacitive elements, batteries or combinations of these elements.

Another preferred embodiment includes placing an EMC (electromagnetic compatibility) filter in the input circuit (direct current connections), in the output of the circuit (alternating current connections) or distributed in said circuit.

The circuit can also be connected to a control unit adapted to control the switching through a series of turn-on signals generated on its output and led to the first, second, third, fourth, fifth and sixth switching elements. Another alternative is that the circuit is connected to a control unit adapted to control the switching through a series of turn-on signals generated on its output and led to the first, second, fourth, fifth, sixth and eighth switching elements, all so depending on the nature of the switching elements in each one of the embodiments described above. Said control unit may contain at least a calculation module, consisting of at least one programmable electronic device that may be a general purpose processor, a microcontroller, a digital signal processor (DSP), an application specific integrated circuit (ASIC) or a programmable card (FPGA).

In a preferred embodiment, the turn-on signals of the switching elements are carried out by means of pulse width modulation.

The invention can be applied to various fields, by way of example indicating that the direct current connections can be connected to a photovoltaic unit, to an electro-chemical cell unit, or other source of direct current.

The direct connection of an input terminal to an output terminal allows grounding the source of direct current, when the grid terminal that connects to the input one corresponds to the neutral terminal.

Then, to facilitate a better understanding of this specification and being an integral part thereof, some figures in which the object of the invention has been represented in an illustrative and not limitative manner, as well as some circuits belonging to the state of the art, are attached.

DESCRIPTION OF ONE OR MORE EMBODIMENTS OF THE INVENTION

Figure 1:
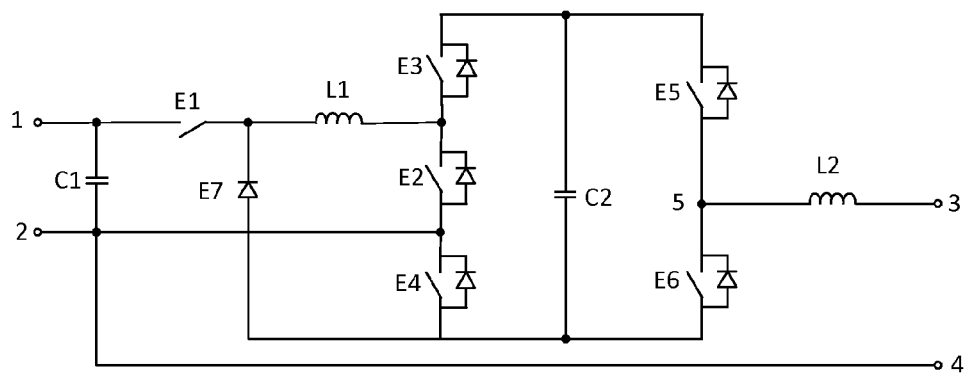
FIG. 1.—Shows a circuit diagram of a first embodiment of an electric circuit for converting direct current into alternating current, according to the present invention.

FIG. 1 shows a first embodiment of the circuit of the invention. This first embodiment comprises:
- two direct current connections (1, 2) to which a source of direct current is connected;
- a first temporary energy accumulator (C1) connected between the direct current connections (1, 2);
- a first branch connected between the direct current connections (1, 2), and which comprises a first switching element (E1), a first inductance (L1) and a second switching element (E2);
- a second branch comprising a third switching element (E3), connected at the junction point of the second switching element (E2) with the first inductance (L1);
- a third branch comprising a fourth switching element (E4), connected at the junction point of the second switching element (E2) with a direct current connection (2);
- a second temporary energy accumulator (C2) connected between the third and fourth switching elements (E3, E4);
- a fourth branch comprising a fifth switching element (E5) and a sixth switching element (E6); with the fifth switching element (E5) being connected to the junction point of the second temporary energy accumulator (C2) with the third switching element (E3), and with the sixth switching element (E6) being connected to the junction point of the second temporary energy accumulator (C2) with the fourth switching element (E4);
- a fifth branch comprising a seventh switching element (E7) that is connected between the junction point of the first switching element (E1) with the first inductance (L1) and the junction point of the second temporary energy accumulator (C2) with the fourth switching element (E4) and the sixth switching element (E6);
- two alternating current connections (3 and 4), to which an element selected from the electrical grid and a load ready to work with alternating current, is connected;
- a sixth branch comprising a second inductance (L2) connected between the junction point of the fifth switching element (E5) and the sixth switching element (E6) and an alternating current connection (3).

In said embodiment, the switching element E1 is of transistor-type (MOSFET, IGBT, J-FET or other that fits the corresponding circuit configuration), the E7 is diode-type and E2, E3, E4, E5, E6 are transistors with respective diodes connected in antiparallel.

Moreover, the accumulators C1 and C2 can be capacitive, ultra capacitive elements, batteries, or combinations thereof.

The proposed topology allows obtaining a floating voltage in C2, subsequently used by the switching elements E2, E3, E4, E5 and E6, which act as DC/AC stage, for obtaining an alternating output voltage. The floating voltage of C2 is achieved by means of a coordinated action of switching elements E1, E2, E3, E4 and E7, which act as DC/DC stage of elevator nature. It is therefore a conversion structure formed by a DC/DC stage and other DC/AC, shared by the switching elements E2, E3 and E4. For a proper operation of the proposed conversion structure, the voltage of C2 must be at least the maximum voltage of the grid.

Since the DC/DC and DC/AC stages that forms part of the proposed topology share the elements E2, E3 and E4, the operating modes of the structure depend on the half-cycle of the grid voltage to be operated on, such as explained later.

The direct connection of an input terminal (2) to an output terminal (4) allows grounding the source of direct current, when the grid terminal that is connected to (4) corresponds to the neutral terminal.

Figure 2:
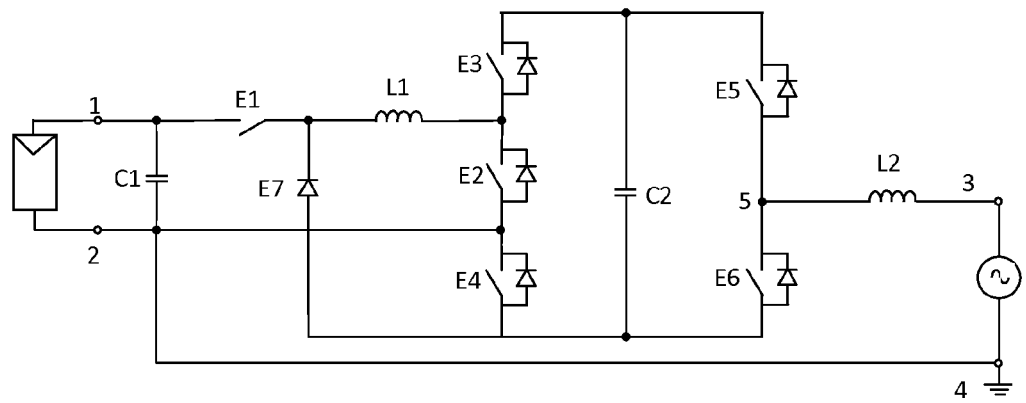
FIG. 2.—Shows the use of the first embodiment with a photovoltaic array in which the negative of the photovoltaic array is connected to ground by joining said terminal with the neutral point of the electrical grid.

FIG. 2 shows the use of the first embodiment taking as a source of direct power a photovoltaic generator, wherein the negative of the generator is connected to ground by joining said terminal with the neutral point of the electrical grid. In this case, the operation of the structure is as follows:

During the positive half-cycle:
E1 and E4 remain turned on.
The control of the DC/DC stage is performed through the switching of E2. When E2 is turned on, the current of the coil L1, which flows through E1 and E2, increases. When E2 is turned off, the current of L1 flowing through E1, E3 and E4, decreases.
The control DC/AC stage is performed through the switching of the elements E5 and E6. When E5 is turned on, $V_{52}=V_{C2}$ and the current of the coil L2, which flows through E4 and E5, increases. When E6 is turned on, $V_{52}=0$ and the current of the coil L2, which flows through E4 and E6, decreases. Where $V_{52}$ is the potential between points 5 and 2, and $V_{C2}$ is the potential of the temporary accumulator C2.

During the negative half-cycle:
E2 and E3 remain turned on.
The control of the DC/DC stage is performed through the switching of E1. When E1 is turned on, the current of the coil L1, which flows through E1 and E2, increases. When E1 is turned off, the current of L1 flowing through E3 and E7, decreases.
The control of the DC/AC stage is performed through the switching of the elements E5 and E6, which act in a complementary manner. When E6 is turned on, $V_{52}=-V_{C2}$ and the current of the coil L2, which flows through E2, E3 and E6, increases. When E5 is turned on, $V_{52}=0$ and the current of the coil L2, which flows through E2, E3 and E5, decreases.

In this way, an independent control of the current in each coil is performed.

The control signals for the used switching elements are determined by a control unit that has at least one calculation and one logic units to implement the control strategy. The calculation module comprises at least one programmable electronic device, which may be one general purpose microprocessor, a microcontroller, a digital signal microprocessor (DSP), an application specific integrated circuit (ASIC), a programmable card (FPGGA) or any combination of the above, responsible for setting the updated values of the working point of the power source.

Figure 3:
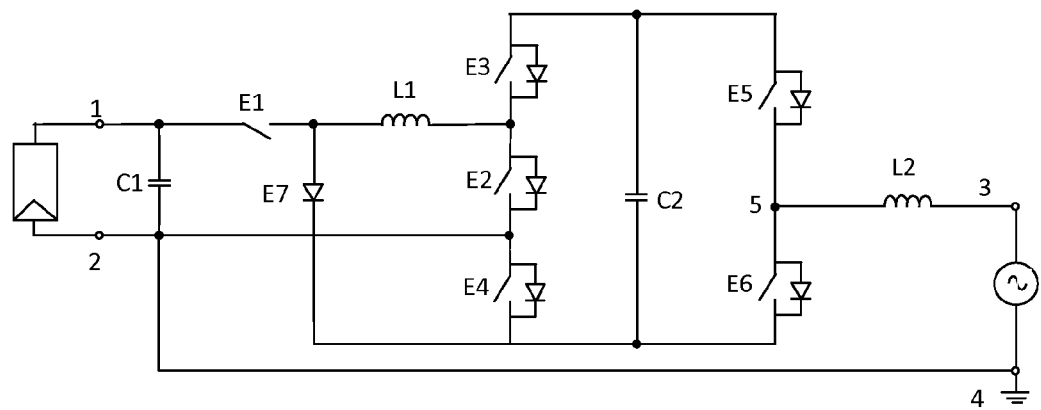
FIG. 3.—Shows the use of the first embodiment with a photovoltaic array in which the positive of the photovoltaic array is connected to ground by joining said terminal with the neutral point of the electrical grid.

FIG. 3 shows the use of the first embodiment with a photovoltaic array, wherein the positive of the photovoltaic array is connected to ground by joining the positive terminal with the neutral point of the grid. In this case, the operation of the structure is as follows:
During the positive half-cycle:
E2 and E3 remain turned on.

The control of the DC/DC stage is performed through the switching of E1. When E1 is turned on, the current of the coil L1, which flows through E1 and E2, increases. When E1 is turned off, the current of L1 flowing through E3 and E7, decreases.

The control of the DC/AC stage is performed through the switching of the elements E5 and E6, which act in a complementary manner. When E6 is turned on, $V_{52}=V_{C2}$ and the current of the coil L2, which flows through E2, E3 and E6, increases. When E5 is turned on, $V_{52}=0$ and the current of the coil L2, which flows through E2, E3 and E5, decreases.

During the negative half-cycle:

E1 and E4 remain turned on.

The control of the DC/DC stage is performed through the switching of E2. When E2 is turned on, the current of the coil L1, which flows through E1 and E2, increases. When E2 is turned off, the current of L1 flowing through E1, E3 and E4, decreases.

The control of the DC/AC stage is performed through the switching of the elements E5 and E6. When E5 is turned on, $V_{52}=-V_{C2}$ and the current of the coil L2, which flows through E4 and E5, decreases. When E6 is turned on, $V_{52}=0$ and the current of the coil L2, which flows through E4 and E6, increases.

Figure 4:
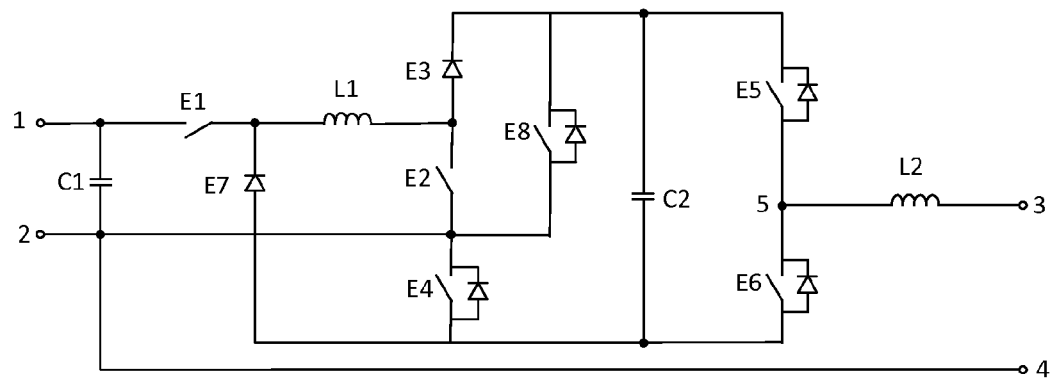
FIG. 4.—Shows a circuit diagram of a second embodiment of an electric circuit for converting direct current into alternating current, according to the present invention.

FIG. 4 shows a second embodiment of the invention. In this case a new switching element E8 is placed in parallel with the switching elements E2 and E3, such as shown in FIG. 4. The use of the switching element E8 allows reducing the current in E2.

In this second embodiment, the switching elements E1 and E2 are transistor-type (MOSFET, IGBT, J-FET or other that fits the corresponding circuit configuration), E3 and E7 are diode-type and E4, E5, E6 and E8 are transistors with respective diodes connected in antiparallel.

The converter operation is similar to that shown in the first embodiment, taking into account that E8 will remain on in those states in which E2 and E3 were simultaneously turned on (E8 complements E4). In this way, the operation during the positive half-cycle will be similar, and in the negative one will be as follows:

E2 and E8 remain turned on.

The control of the DC/DC stage is performed through the switching of E1. When E1 is turned on, the current of the coil L1, which flows through E1 and E2, increases. When E1 is turned off, the current of L1 flowing through E2, E8 and E7, decreases.

The control of the DC/AC stage is performed through the switching of the elements E5 and E6. When E6 is turned on, $V_{52}=-V_{C2}$ and the current of the coil L2, which flows through E6 and E8, decreases. When E5 is turned on, $V_{52}=0$ and the current of the coil L2, which flows through E5 and E8, decreases.

The proposed topology presents a series of improvements with respect to the structures of the state of the art:

The direct connection of the coil L2 to one of the terminals of the alternating current connections (3) guarantees that current injected into the electrical grid does not suffer discontinuities (it is not pulsating).

Due to the elevator nature of the DC/DC stage used, this can work with input voltages lower than the maximum grid voltage, resulting in a wide range of input voltages.

The use of a DC/DC stage allows decoupling the ripple that appears in the capacitor C2 of the photovoltaic array, avoiding the losses by voltage fluctuation around the maximum power point of the photovoltaic array that appear in systems with a single DC/AC stage directly connected to the photovoltaic array.

The circuit can operate with a voltage across the capacitor C2 equal to the maximum grid voltage, half the voltage needed for the structures based on a bipolar direct voltage. In this way, the size of the required capacitor will be smaller.

On the other hand, the used DC/AC stage provides three levels of voltage $V_{52}$: $V_{C2}$, 0 and $-V_{C2}$. Therefore a structure with a behavior similar to that in obtained in a NPC-half bridge is obtained, but using two elements less, which reduces the number of semiconductors (for the same behavior) with respect to the structures of the state of the art.

The shared use of E3 and E4 by the DC/DC and DC/AC stages, can reduce the conduction losses of these elements, since the currents of L1 and L2 flowing in opposite directions there through. In this way a DC/AC conversion structure with lower losses than those obtained in a unipolar modulated H-bridge or NCP (Neutral Point Clamped) half-bridge is obtained, which improves the overall performance of the conversion structure.

During the positive half-cycle, the current flows from the direct current power supply constantly, by being E1 always on. This minimizes the value of current in the coil L1, reducing losses in the elements of the DC/DC stage, against structures such as DE 196 42 522 C1, DE 197 32 218 C1, DE 10 2006 012 164 A1 and WO 2008 151587 A1, in which this current is always pulsating and therefore the current value in L1 should be higher for the same power transfer.

The invention claimed is:

1. Electric circuit for converting direct current into alternating current, being a single-phase inverter circuit that conditions and converts direct current into alternating current, which comprises:

two direct current connections (1, 2) to which a source of direct current is connected;

a first temporary energy accumulator (C1) connected between the direct current connections (1, 2);

a first branch connected between the direct current connections (1, 2), and which comprises a first switching element (E1), a first inductance (L1) and a second switching element (E2);

a second branch comprising a third switching element (E3), connected at the junction point of the second switching element (E2) with the first inductance (L1);

a third branch comprising a fourth switching element (E4), connected at the junction point of the second switching element (E2) with a direct current connection (2);

a second temporary energy accumulator (C2) connected between the third and fourth switching elements (E3, E4);

a fourth branch comprising a fifth switching element (E5) and a sixth switching element (E6); with the fifth switching element (E5) being connected to the junction point of the second temporary energy accumulator (C2) with the third switching element (E3), and with the sixth switching element (E6) being connected to the junction point of the second temporary energy accumulator (C2) with the fourth switching element (E4);

a fifth branch comprising a seventh switching element (E7) that is connected between the junction point of the first switching element (E1) with the first inductance and the junction point of the second temporary energy accumulator (C2) with the fourth switching element (E4) and the sixth switching element (E6);

two alternating current connections (3 and 4), to which an element selected from electrical grid and a load ready to work with alternating current, is connected;

a sixth branch comprising a second inductance (L2) connected between the junction point of the fifth switching element (E5) and the sixth switching element (E6) and an alternating current connection (3).

2. Electric circuit according to claim 1 wherein:

the first switching element (E1) is selected from MOSFET, IGBT and J-FET transistors;

the second, third, fourth, fifth and sixth switching elements (E2, E3, E4, E5 and E6) are selected from MOSFET, IGBT and J-FET transistors, connected in antiparallel with respective diodes; the seventh switching element (E7) is diode-type.

3. Electric circuit according to claim 1 wherein an eighth switching element (E8) connected in parallel with the third switching element (E3) and the second switching element (E2) is included.

4. Electric circuit according to claim 3 wherein:

the first and second switching elements (E1, E2) are selected from MOSFET, IGBT and J-FET transistors;

the fourth, fifth, sixth and eighth switching element (E4, E5, E6 and E8) are selected from MOSFET, IGBT and J-FET transistors, connected in antiparallel with respective diodes, the third and seventh switching element (E3 and E7) are diode-type.

5. Electric circuit according to claim 1 wherein the first and second temporary energy accumulators (C1, C2) are selected from capacitive, ultra capacitive elements, batteries and a combination thereof.

6. Electric circuit according to claim 1 comprising an electromagnetic compatibility filter at a location selected between the direct current connections (1, 2), alternating current connections (3, 4) and distributed in the circuit.

7. Electric circuit according to claim 2 wherein said circuit is connected to a control unit adapted to control the switching through a series of turn-on signals generated at its output and directed to the first, second, third, fourth, fifth and sixth switching elements (E1, E2, E3, E4, E5 and E6).

8. Electric circuit according to claim 4 wherein said circuit is connected to a control unit adapted to control the switching through a series of turn-on signals generated at its output and directed to the first, second, fourth, fifth, sixth and eighth switching elements (E1, E2, E4, E5, E6 and E8).

9. Electric circuit according to claim 7 or 8 wherein the turn-on signals on the switching elements are carried out by means of pulse width modulation.

10. Electric circuit according to claim 7 or 8 wherein the control unit contains at least one calculation module, comprising at least one programmable electronic device selected from a general purpose processor, a microcontroller, a digital signal processor (DSP), an application specific integrated circuit (ASIC) and a programmable card (FPGA).

11. Electric circuit according to claim 1 wherein the source of direct current is selected from a photovoltaic unit, an electro-chemical cell unit and a source of direct current.

12. Electric circuit according to claim 1, wherein the alternating current connection (4) that is directly connected to the direct current connection (2) is the neutral terminal.

* * * * *